June 3, 1969  P. C. WHITENER ET AL  3,447,761
SUPERSONIC AIRPLANE VARIABLE-SWEEP INTEGRATED AIRFOIL SYSTEM
Filed June 12, 1967  Sheet _1_ of 8
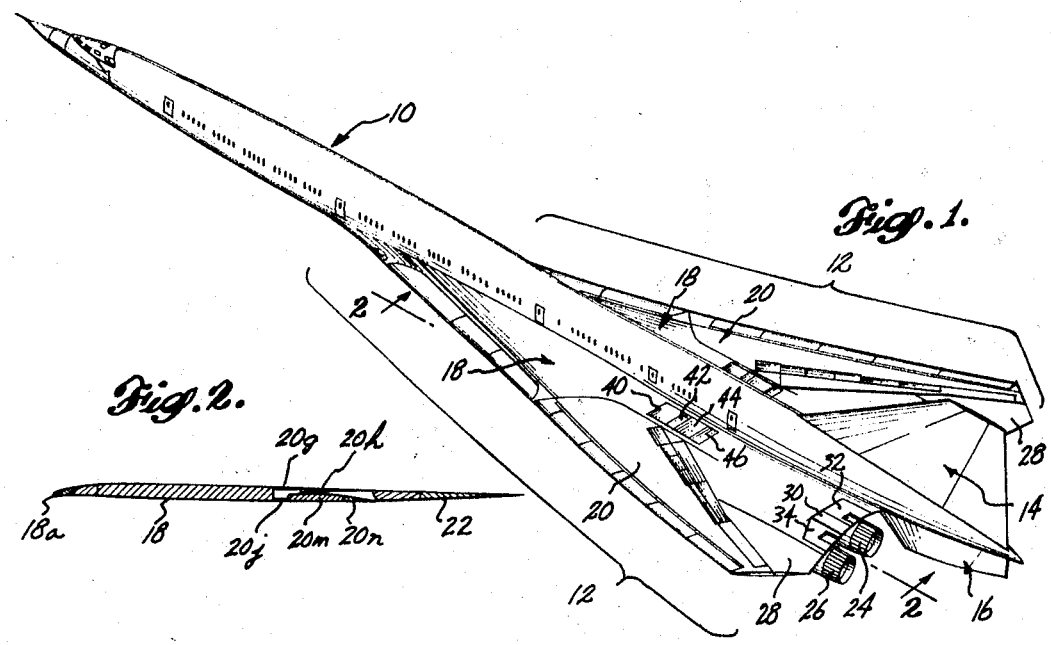
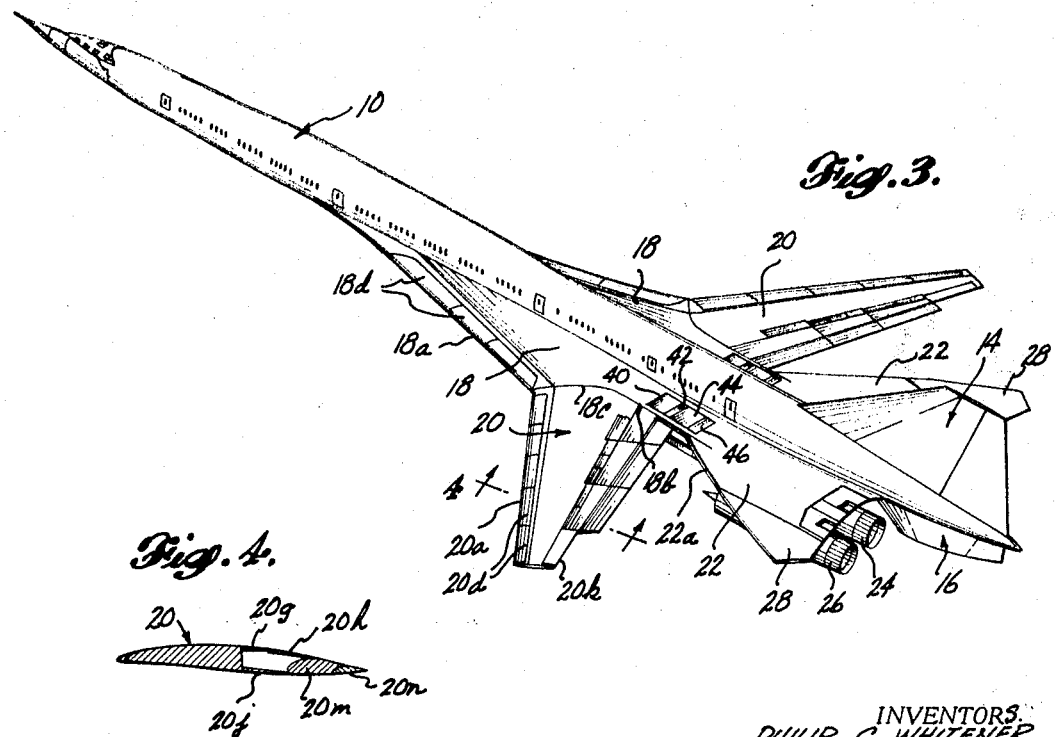
INVENTORS.
PHILIP C. WHITENER
ROBERT R. WADLEIGH
BY DAVID G. BLATTNER
Christensen, Sanborn & Matthews
ATTORNEYS

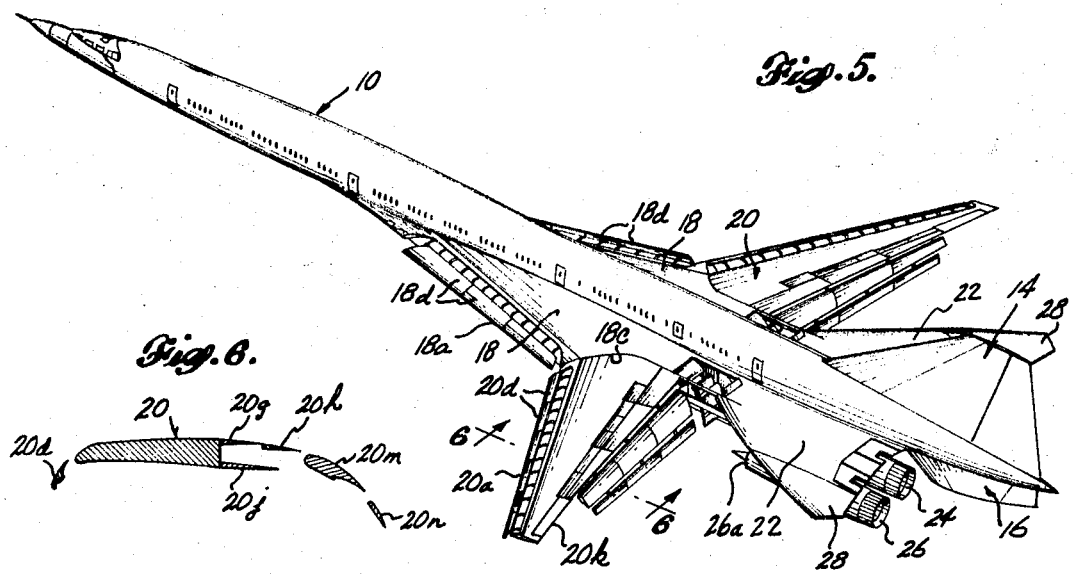
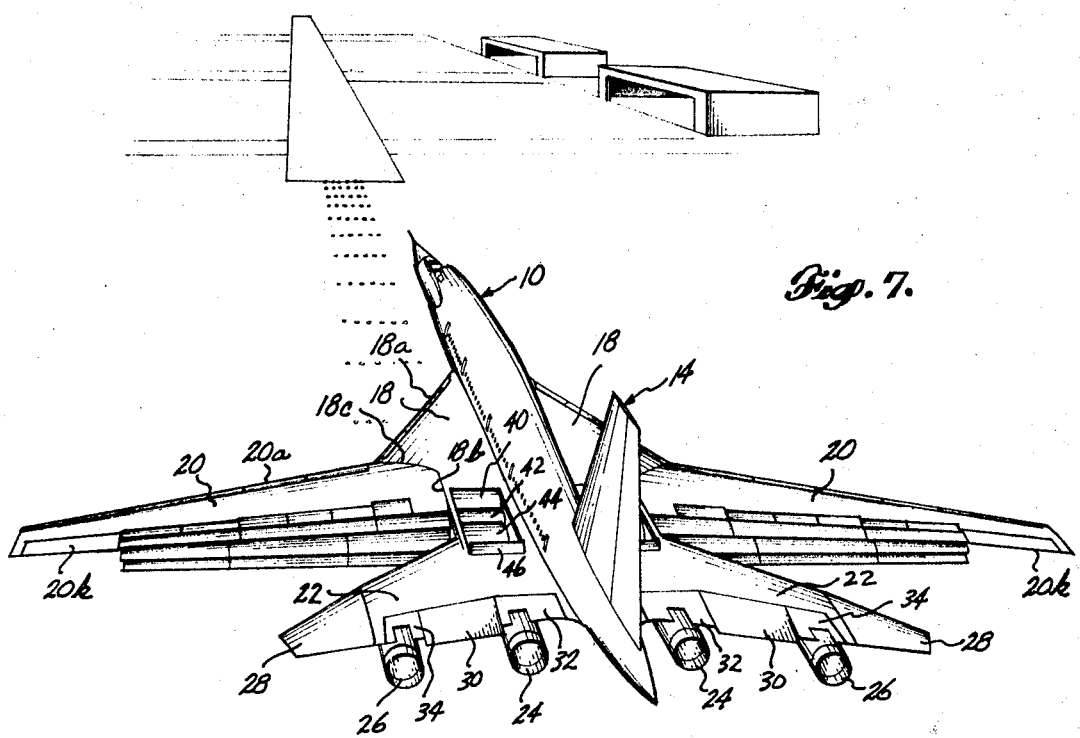

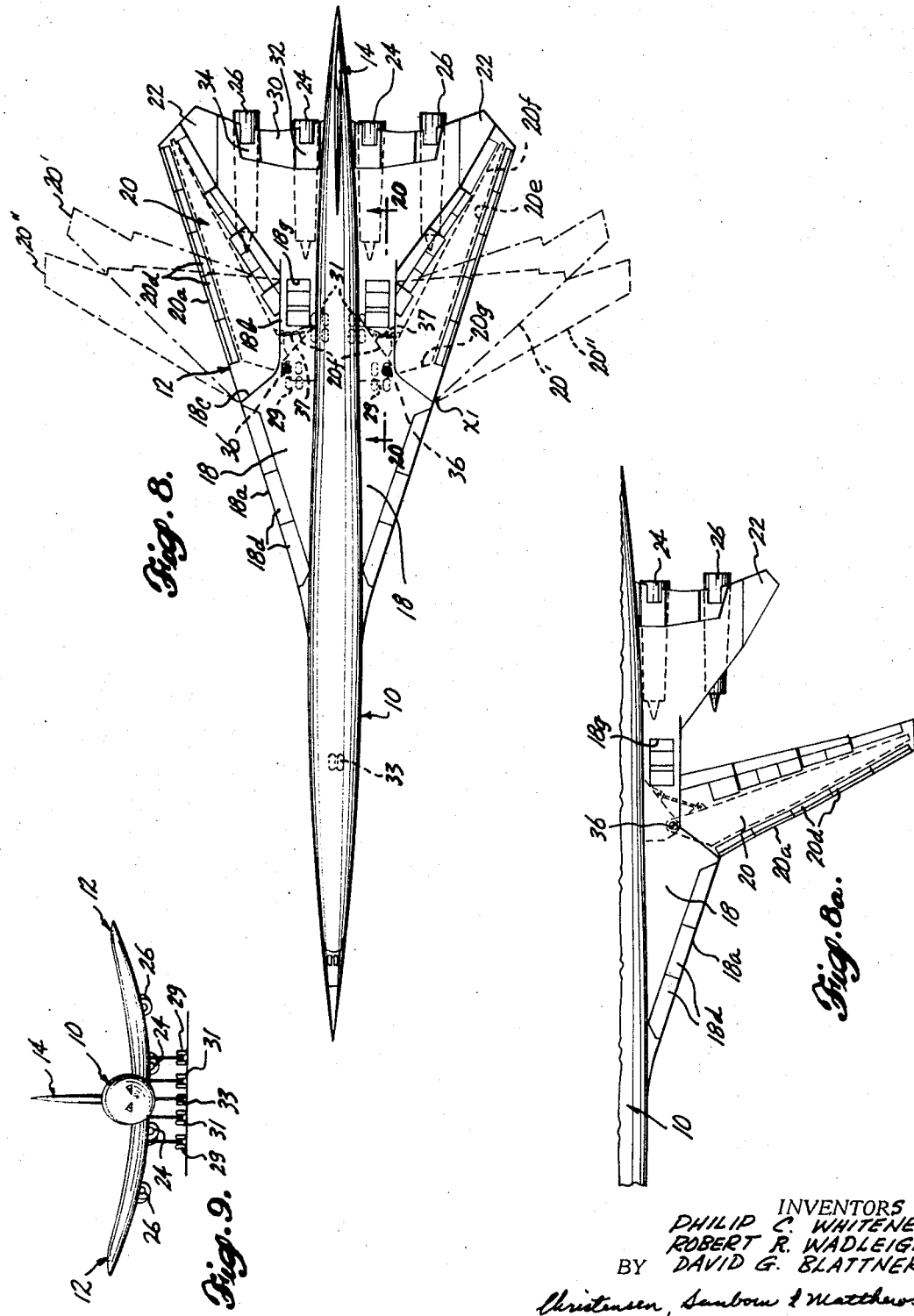

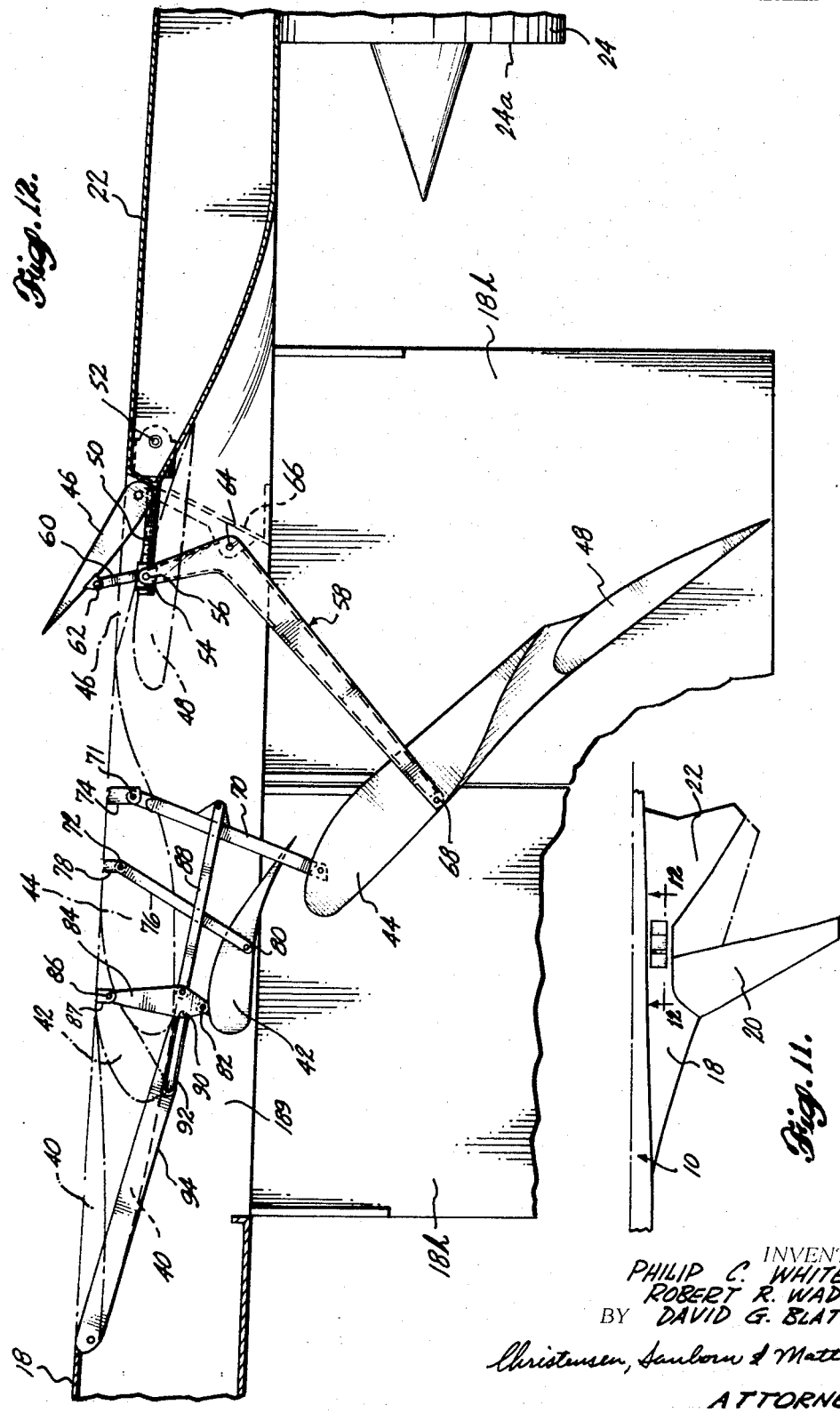

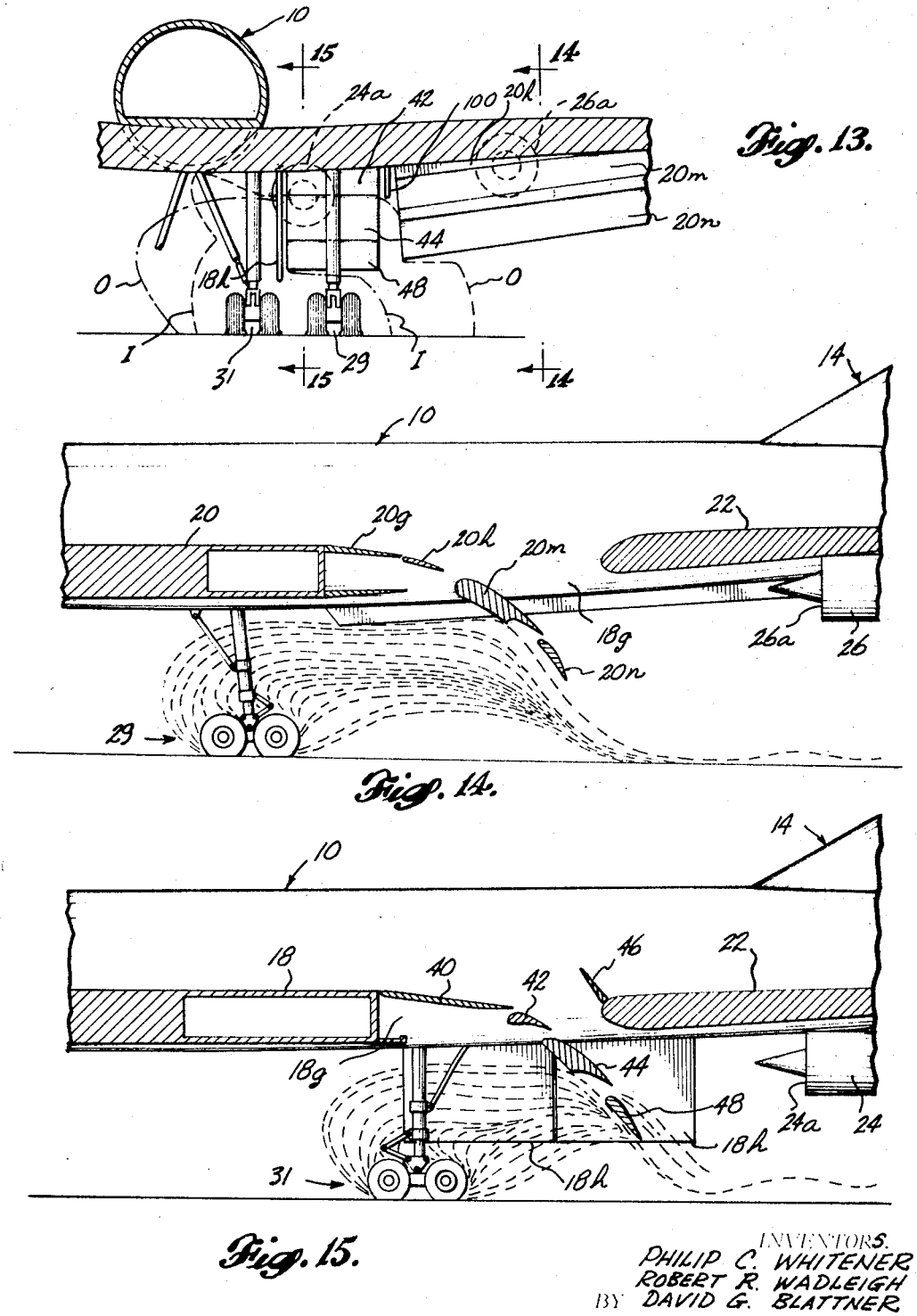

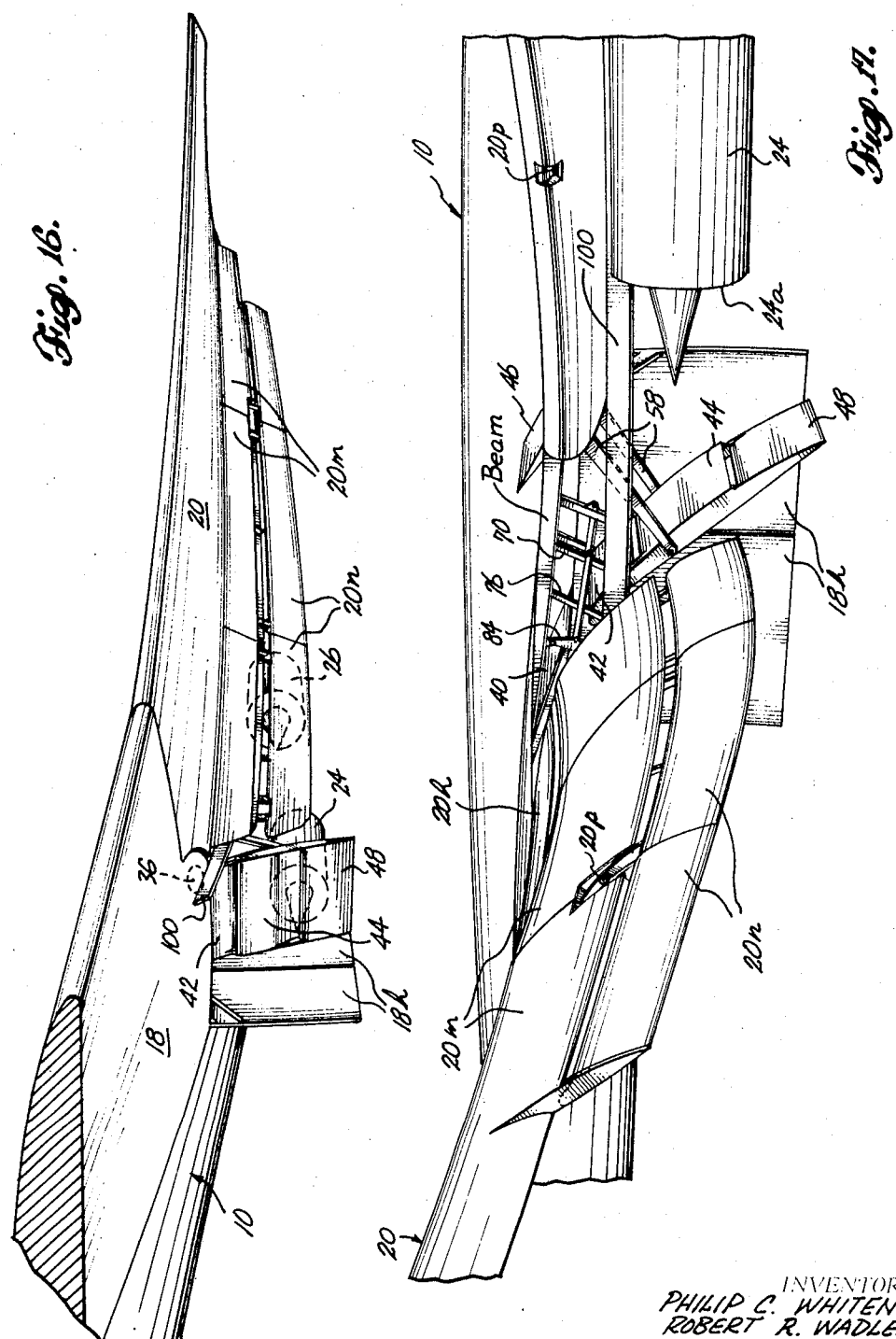

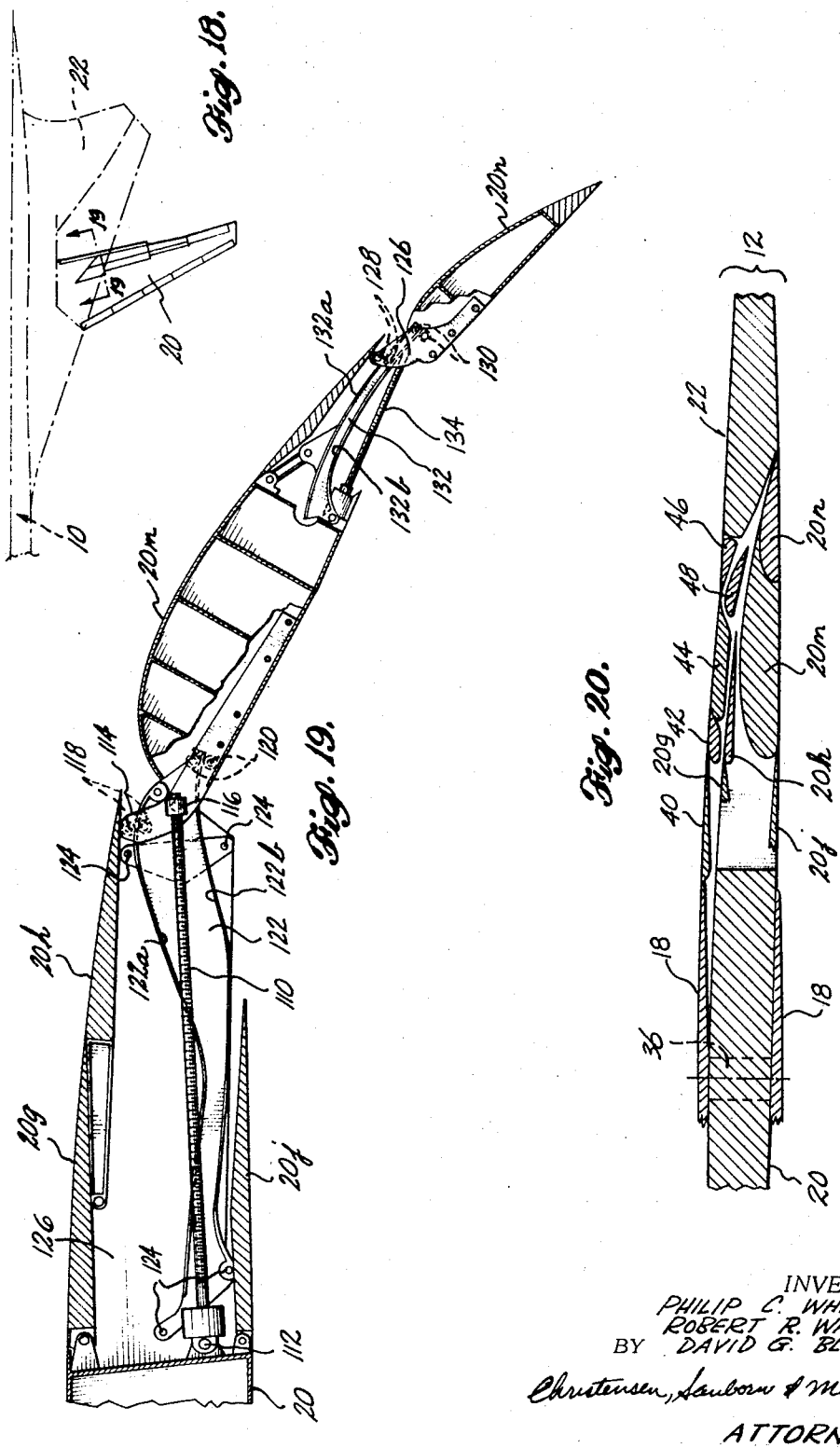

3,447,761
SUPERSONIC AIRPLANE VARIABLE-SWEEP INTEGRATED AIRFOIL SYSTEM
Philip C. Whitener and Robert R. Wadleigh, Seattle, and David G. Blattner, Mercer Island, Wash., assignors to The Boeing Company, Seattle, Wash., a corporation of Delaware
Filed June 12, 1967, Ser. No. 645,254
Int. Cl. B64c 3/42, 9/38, 25/04
U.S. Cl. 244—15      22 Claims

ABSTRACT OF THE DISCLOSURE

This invention provides a variable-sweep integrated airfoil system the main wing of which cooperates with an inboard fixed stub wing and an associated tail wing to compose a high sweep Delta planform configuration for the supersonic flight regime. In this setting, the main wing is shortened in its chord, and the relatively bluntly rounded nose of the tail wing and the deep aft spar section of the main wing are bridged together by trailing edge panels on the main wing so as to form a continuous unitary airfoil. Hinged by its root on the stub wing, the main wing is swung forward and away from the tail wing for subsonic flight. When this occurs, flaps normally retracted in nested relationship between the edge panels of the chord-shortened main wing are partially extended aft and, conjunctively with the trailing edge panels of the main wing, thereby increase the chord length and reform the airfoil section of the main wing for efficiency in the high subsonic cruise regime. In the forward position of the main wing, trailing edge panel sections serve as spoilers and are usable for lateral control. In the fully forward position of the main wing, used for landing and taking off, the flaps are further extended, depressed, and separated so as to form an efficient high-lift composite airfoil. Flaps in the stub wing are then depressed so as to carry the line of high lift devices inboard to the side of the fuselage and thereby not only increase the total lift but improve the load distribution across the airfoil span. The stub wing flaps also provide an ingestion shield for the inboard engines aft thereof. Through-openings in the stub wings uncovered with extension of the stub wing flaps provide auxiliary paths for increasing airflow to the engine inlets when the normal inflow pattern is partially obstructed by these flaps in their shielding positions. Overlapping relationship between the main wing and stub wing aft of the main wing pivot is achieved by nesting the sets of flaps in the respective wings at relatively different levels, thereby to obviate the necessity for eliminating the stub wing flaps or a sectoral portion of the main wing or its inboard flaps for purposes of clearance in the swept-back position of the main wing.

Description

This invention relates to improvements in supersonic airplanes and, more particularly, to an improved airfoil system by which a supersonic airplane may also be flown safely and efficiently at low landing and take-off speeds as well as at high subsonic speeds. The invention is herein illustratively described by reference to the present preferred embodiment thereof; however, it will be recognized that certain modifications and changes therein with respect to details may be made without departing from the essential features involved.

The broad concept of composing a Delta planform supersonic airfoil configuration one portion of which comprises a main wing hinged at its root to swing forward to form an airfoil surface separate from the tail wing for subsonic flight is not original with this invention. However, it will be recognized that the creation of an efficient, safe and competitive supersonic transport airplane of practicable design employing this concept entails much more than an exercise in the geometry of moving planform segments together and apart, employing split ailerons to fair with the tail wing in the supersonic regime and to close the trailing edge of the main wing in the subsonic flight regime, allowing for the desired dihedral or incidence setting of the main wing by the orientation of the hinge axis, and similar elemental provisions which were included in one prior proposal. In coming down to the practical design of a workable commercial aircraft, the prior art approach was not a full solution. Rather it poses a number of unresolved difficulties so unique as to require new and original concepts of design if in fact the variable-sweep integrated airfoil concept was to be made workable. For example, in order to appropriately space and adequately support the engines, it is desirable to suspend them beneath the fixed tail wing portion of the airfoil system aft of the main landing gear and thereby make them vulnerable to damage by ingestion of foreign materials, such as water, slush, landing wheel tire fragments, and other objects. Attempts to erect shields or deflectors across the inlets of these engines, mounted as they are beneath an expansive airfoil bottom surface extending large distances forwardly and outboard from the engine locations, are self-defeating unless accompanied by means for increasing the supply of engine air, at least to the extent it is diminished by the shielding means. In addition, it is important to provide a sufficient and properly distributed high-lift means (i.e., flaps) for the extended main wing in the low-speed landing and takeoff regimes, as opposed to the prior art concept confining the movable wing elements to the outboard portion of the main wing as a limitation imposed by odd wing shapes and relationships, thereby not only to preclude working adequate high-lift means into the design but to aggravate the structural and weight problems of wing design. Rather, for safe landings at low speeds with maximum load capacity, it is essential to distribute the high-lift devices along as much of the airfoil span as possible. Moreover, for good performance characteristics with a high lift-to-drag ratio it is necessary for subsonic cruise to employ an efficient airfoil cross section substantially from root to tip of the wing. At the same time, however, these objectives create a problem of conflicting requirements when it is considered that in the swept-back position of the main wing its aft spar section should be comparable in depth with the deep spar section of the tail wing necessary to support the latter's large and bluntly rounded leading edge desired for low-speed flight, and that the root portion of the swept-back main wing aft of its hinge should be substantially at the wide part of the main wing and should carry flaps for lift and spoilers for control, and must overlap the very inboard area where, if possible, incorporation of additional high-lift devices is important.

With these and similar considerations in view, it is a broad object of this invention to provide a variable-sweep airfoil system for supersonic airplanes enabling the same to be operated efficiently and safely at very low speeds for landing and taking off in conventional manner. A related object is to devise such an airplane wing system which will also permit the airplane to operate efficiently in sustained flight at high subsonic speeds so as to qualify competitively on short runs, and generally sustain flight with high efficiency at any of various speeds.

A further object hereof is to devise a variable-sweep integrated wing system in which a substantially continuous line of retractable high-lift devices, uninterrupted by engine inlets or exhausts and extending inboard substantially to the side of the airplane body, are provided to operate in conjunction with the main wing in its sweptforward position. By the magnitude of span which they occupy, they add maximum lift for taking off and landing, and by their uniform distribution to a point close inboard they keep the structural design parameters of the wing structure manageable, and permit a strong wing of relatively light design. A related object, therefore, is to provide an airfoil system which will be light and strong with high performance and lift at low speeds.

A further object hereof is to accommodate rearward pivoting of the main wing back against the tail wing by accommodating attendant overlap of a root portion of the main wing with the inboard stub wing which supports the same.

A further important object hereof is to provide such a main wing and stub wing joint configuration as will permit so locating the hinge point on the main wing's root and on the stub wing as to simplify the external junction closure between them in the different positions of the main wing by reason of the favorable path of motion of main wing root surface areas relative to the stub wing edge regions.

A specific object is to devise a variable-sweep integrated wing system of the described nature in which the main wing, stub wing and tail wing combine to form a supersonically efficient airfoil having low camber and minimum ratio of depth to chord, with a high sweepback angle of the leading edge, thereby minimizing wave and trim drag as necessary for efficient supersonic flight. In this same connection, it is a purpose hereof to utilize structurally deep spar sections in both the aft portion of the main wing and the forward portion of the tail wing whereby, with the wings functioning independently, in the low-speed regimes, the desired deep structures and large effective leading edge radii of airfoils are presented and maximum space is afforded for systems and fuel containment as well as for more efficient primary wing structure. In order to achieve this result in a practical airfoil design the invention provides a system of flaps and trailing edge panels positioned and movable to reconstitute the airfoil section of the main wing when drawn forward from the tail wing for subsonic flight, while providing for internal storage of the flaps and merging of the main wing with the tail wing by the panels to complete a continuous unitary airfoil section when the main wing is moved back for supersonic flight.

A related purpose is to provide such trailing edge panels which can also function as spoilers sufficient in size and span along the main wing to offset the flaps during landings and to serve as substitute lateral control surfaces in the subsonic cruise regime when outboard aileron control effect could undergo an inversion due to reactionary torsional flexure of the main wing structure about its longitudinal axis.

A further object hereof is to provide in a variable-sweep wing system a system of flaps and trailing edge panels which will perform multiple functions in the respects mentioned above, which will be compact, compatible with design objectives as aforestated, and along inboard stations will be suitably retractable so as to provide clearance for wing root overlap with stub wing parts.

Still another object of this invention is to provide a flap system for a variable-sweep supersonic aircraft wing which flap system will combine the aforementioned functions with needed ingestion protection for the underslung engines of the airplane by forming deflective shielding surfaces interposed between the landing gear and the engines. However, it is also a purpose to provide such a shielding flap system which in the process of deflecting objects from the engine inlets and thereby partially cutting off normal flow of air to the engines, also opens up auxiliary flow paths to compensate.

Other benefits provided by the use of lift-creating flaps as protection for the engine inlets include reduction of bird ingestion during airplane motion on or near the ground, preventing ingestion of material dropping from the landing gear during its retraction, and reduction of engine inlet flow distortion due to the presence of landing gear in front of the inlets. A related benefit lies in the greater lift available from the flaps due to the sucking of large quantities of air by the engines over the top surfaces of the flaps. Moreover, in the case of the inboard flap system associated with the stub wings to protect the inboard engines, pitchdown moment caused by flap extension is greatly reduced over what it is with comparable flaps at a trailing edge location in a conventional airplane wing system.

Thus, the present invention features a variable-sweep integrated supersonic airfoil, the component main wing of which, viewed in planform, is not required to be notched or reduced in chord-length near its base so as to permit swinging it aft but may in fact undergo a progressive increase of width substantially to the outboard edge of the stub wing from which it projects laterally in subsonic cruise position. To this end, overlap is permitted between the main and stub wings aft of the main wing pivot when the main wing is swung aft into its supersonic cruise position. This permits the main wing hinge to be located at a mid-chord position at the main wing root and at a location on the stub wing aft and inboard from the junction between the stub wing's trailing edge and the main wing's leading edge so as to provide a favorable path of motion, simplifying junction closure, of surface portions of the main wing in relation to the outboard rim edge of the stub wing with the latter serving as a receptacle for root portions of the main wing in its various angular positions of adjustment.

A further feature resides in the provision of sets of flaps mounted in normally covered through-openings formed in the stub wings inboard and aft of the main wing hinges. When operatively moved aft and deflected downward these inboard flaps effectively shield the underslung aft-mounted jet engines behind them against ingestion of foreign materials thrown up by the landing wheels, and they additionally function to extend inboard the line of flaps on the main wing. In so doing they not only increase and more widely distribute the total lift of the wing system, but they move the centers of lift and bending moment inboard as desired. By positioning of these inboard flaps to underlie the stub wing through-openings with the flaps extended, and thereby to shield the inboard engine inlets against ingestion, the resultant induction of air downward through these openings caused by engine suction compensates for the flow-restricting effect of the flaps (and overcomes the otherwise disturbing effect of the extended landing gear on the engine inlet flow pattern). Such induction flow also increases the air velocity across the top surfaces of the extended flaps so as to make them even more effective in lift. Similar ingestion shielding of the outboard engines by the extended main wing flaps also occurs, and with some degree of the same collateral effects mentioned above; however, in this instance the problem of engine inlet airflow is not as critical because of the relative outboard positions of these engines out of the line of the landing gear and the larger available area for airflow to the inlets afforded by the relatively large gap between the outboard engine inlets and the forwardly extended main wing.

Still other features reside in the cooperative forms and positioning arrangements of the inboard wing and main wing flap systems, and of the main wing trailing edge panels. One such feature comprises mounting of the flaps with heightwise offset between the inboard flaps in nested position and the main wing root end flaps in their nested position so as to permit overlap therebetween when the main wing is swung aft. Another such feature comprises a main wing flap system, the elements of which are stowable in forwardly nested position in the internal space defined between hinged trailing edge panels, thereby to shorten the main wing chord when such panels are spread apart so they may close with the top and bottom surfaces at the leading edge of the tail wing. As such, the main wing's aft spar and the tail wing's front spar may be made deep in cross section, with certain attendant advantages as mentioned above. Being also relatively proximate to each other when the wings are locked together, these deep spar sections add greatly to the bending strength of the integrated airfoil main structure. Moreover, this same system of main wing flaps and edge panels cooperate by shifting aft and tilting relatively so as to increase the chord width and reconstitute the airfoil configuration of the main wing to provide efficiency in subsonic cruise. Use of the line of top surface trailing edge panels as spoilers to control flight in the high subsonic regime is also achieved in the novel arrangement.

The foregoing and other features, objects and advantages of the invention will become more fully evident from the following description by reference to the accompanying drawings.

FIGURE 1 is an isometric view of a supersonic airplane incorporating the invention with parts disposed for supersonic flight. FIGURE 2 is a simplified chord section through the integrated airfoil, taken on line 2—2 in FIGURE 1.

FIGURE 3 is an isometric view similar to FIGURE 1 with the main wings hinged forward and the flaps and trailing edge panels set for subsonic cruise. FIGURE 4 is a simplified chord section through the swept-forward main wing, taken on line 4—4 in FIGURE 3.

FIGURE 5 is an isometric view similar to FIGURE 1, with the main wings swept forward to the maximum degree and the flaps and associated trailing edge panels set for landing the airplane.

FIGURE 6 is a simplified chord section of the main wing shown in FIGURE 5, taken on line 6—6 in that figure.

FIGURE 7 is an isometric view from a rear aspect illustrating the improved supersonic airplane making a landing approach.

FIGURE 8 is a simplified plan view of the improved airplane, showing by solid lines the wing components in the supersonic cruise position and by broken lines the main wings extended respectively in the subsonic cruise and landing positions. FIGURE 8A is a corresponding view of half the airplane with the main wing extended.

FIGURE 9 is a front end view of the same airplane.

FIGURE 11 is a simplified fragmentary plan view of one side of the airplane, showing the wing system with the main wing extended.

FIGURE 12 is an enlarged sectional view taken on line 12—12 in FIGURE 11 to illustrate in somewhat simplified and schematic form a suitable linkage, track and drive mechanism by which the inboard or stub wing flap system is operated.

FIGURE 13 is a fragmentary diagrammatic front view of the airplane, showing the positional relationships of the flaps, landing gear and engines so as to provide ingestion shielding of the engines.

FIGURE 14 is a simplified schematic sectional view taken on line 14—14 in FIGURE 13.

FIGURE 15 is a simplified schematic sectional view taken on line 15—15 in FIGURE 13.

FIGURE 16 is an isometric view from an aspect looking up and rearward toward the main wing and associated forward portion of the stub wing, so as to show the inboard and outboard flaps extended and the inboard flap bay doors open.

FIGURE 17 is an isometric view showing the main wing and associated flaps, panels and related components from a rearward aspect.

FIGURE 18 is a schematic plan view of one side portion of the airplane, showing the main wing extended.

FIGURE 19 is a simplified and partly schematic sectional view taken on line 19—19 in FIGURE 18, to illustrate suitable linkage and track mechanisms for controlling position of the main wing flaps and panels.

FIGURE 20 is a simplified chordwise sectional view taken on line 20—20 in FIGURE 8 illustrating overlap of the stub wing and main wing parts aft of the hinge 36.

Figure 10:
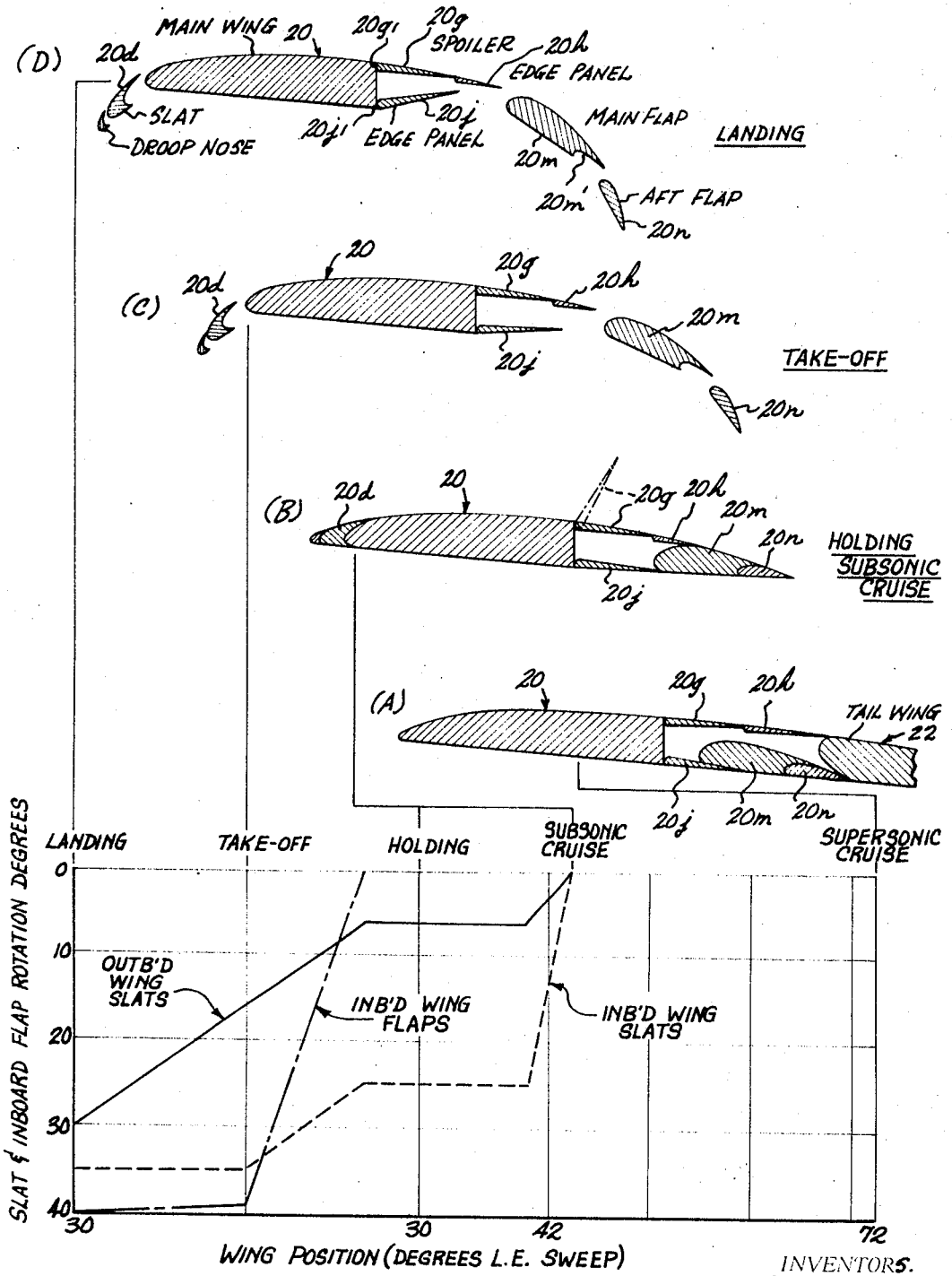
FIGURE 10 is a graphical representation showing successive relative positionings of the main wing movable parts as a function of main wing sweep position.

In FIGURES 1-9, inclusive, the general outward form and positional relationships of airplane parts of primary interest are depicted in small scale. Projecting laterally from each side of the elongated fuselage or body 10, the primary airfoils comprise the two integrated wings 12 forming the high sweepback Delta planform configuration used in supersonic flight. Vertical stabilization and control are derived from the surfaces 14 and 16 respectively projecting above and below the fuselage tail. The specific nature of these surfaces and of the form and construction of the fuselage are no part of this invention and will therefore not be described in detail.

Composite airfoils 12 each include a stub wing 18 with a highly swept leading edge 18a extending outward and aft from the adjacent side of the fuselage commencing at a location in this example approximately one third the distance from nose to tail of the fuselage. This leading edge 18a in a typical design represents approximately half the leading edge length of the wing semi-span. The remainder is provided by the leading edge 20a of the main wing 20 in its swept-back position wherein the leading edges 18a and 20a are aligned. As it extends aft along the fuselage the stub wing 18 increases in span to the end of its leading edge 18a then assumes an abruptly decreased span for a distance before it meets and merges with the fixed tail wing 22. The outer edge 18b of the reduced span portion of the stub wing extends substantially parallel with the adjacent side of the fuselage. The outer edge 18c of the stub wing where it undergoes a transition in span extends obliquely to the fuselage along a line defined by the intersection of the upper surfaces of stub wing 18 and main wing 20.

The main wing 20 represents the second major component of the primary Delta airfoil 12. The third and remaining component is the tail wing 22 having a leading edge 22a against which the trailing edge of the main wing 20 abuts in the supersonic cruise position shown in FIGURE 1. Because of the outward taper in chordal width of the main wing from its root to its tip the leading edge 22a of the tail wing has a smaller sweep angle than the composite Delta airfoil leading edge 18a, 20a. As already indicated, the tail wing 22 is in effect an outboard and rearward continuation of the stub wing 18 with which it merges as a continuous fixed airfoil structure. Control surfaces for the horizontal tail portion of the airplane comprise the elevons 28, the elevators 30, and the inboard and outboard auxiliary elevators 32 and 34, respectively, distributed along the trailing edge of the tail wing.

With this airfoil configuration it becomes possible to mount the jet engines at the tail and in underslung positions where their discharge can do no damage to parts nor their presence interfere with wing continuity along the spar. Thus the laterally spaced inboard engines 24 and outboard engines 26 are mounted abreast of each other beneath the after portion of the fixed wing structure 22, 18. It is noted in passing that for a large supersonic transport airplane of the type depicted these jet engines develop enormous power and for that purpose draw great quantities of air into their respective inlets 24a and 26a. Special attention must therefore be given, as later described, to maintaining adequate airflow to these engines in all positions of the main wing and parts thereof, and to preventing engine damage by ingestion of foreign materials, to which they become vulnerable because of their placement more or less directly aft of the extended landing wheels.

The stub wing's outer edges 18b and 18c form a notch, when viewed in planform, and the root end of the main wing occupies this notch. At approximately the mid-chord position of its root end the main wing is pivotally supported on the stub wing structure by a hinge mount 36 located on the stub wing adjacent the corner of the notch formed by the intersecting edges 18b and 18c. Actuated by screw jacks 37, the main wings 20 are free to swing forward away from the tail wings 22 about upright axes defined by the respective hinge mounts 36. Such location of the main wing pivot axis produces motion of its root surface areas in directions favorable to minimizing the formation of variable gaps between those areas and the rim of the stub wing's open end in which the main wing is effectively socketed, as the main wing is swung about its pivot. Thus, as will be seen in FIGURE 8 the main wing's leading edge just aft of where ($\chi/$) it meets the end of the stub wing's leading edge is substantially normal to a radial line through the adjacent wing pivot, so as to move approximately in the direction of its own length as the wing swings. The forward angular displacement out of the normal supersonic cruise position may be varied with the flight regime to be accommodated. Typically, the leading edge sweepback angle of the main wing in its supersonic cruise position (Delta form) is approximately 72 degrees, in its subsonic cruise position 20′ is approximately 42 degrees, and in its subsonic landing regime position 20″ is approximately 30 degrees.

Systems of extensible leading edge slats 18d on the stub wing 18 and leading edge slats 20d on the main wing are provided for the purpose of obtaining increased lift when landing and taking off, as in conventional jet airplanes. With the wing moved forward to its minimum sweep position for low-speed flight the lines of leading edge main wing slats extend more nearly transverse to the line of flight and are therefore more effective. This is also true of the lines of trailing edge flaps on the main wings and of the ailerons and spoiler surfaces associated therewith, as will be hereinafter described.

Viewed frontally, the dihedral of the composite airfoils is not defined by plane geometric surfaces, but is defined by airfoil surfaces which curve upwardly in directions outboard and to the rear of the airplane. The precise contours desired are complicated to define, being determined through calculations and wind tunnel tests in order to arrive at an efficient stable, flutter-free design, and since these details form no part of the present invention, no attempt will be made to describe the same herein.

Landing gear for the airplane comprises two front main wheel trucks 29 and two rear main wheel trucks 31. The main front trucks 29 are spaced laterally apart by a greater distance than the rear trucks 31, the latter being located generally below and in front of the inlets of the inboard engines 24. A central nose wheel truck 33 is also provided as shown.

Principal framing of the main wing structure includes a front spar represented by the line 20e and an aft spar at 20f suitably interconnected at their outer ends and joined to the hinge structure at 36 by oblique frame member 20g. These spars and particularly the aft spar 20f are permitted to be deep in section so as to achieve the aforementioned objectives in the structuring and airfoil configuration of the component wings.

Aft of the main aft spar station (at 20f) the chord width and cross-sectional form of the main wing are subject to programmed adjustment by the relative repositioning of several elements comprising panels and flaps, depending upon the flight regime to be accommodated. Extending sparwise along the wing aft of the aft spar 20f are two lines of panels which can be swung up and down conjointly about a forward hinge axis 20g1. The forward line of panels comprises the spoilers 20g, aft of which are the supplemental edge panels 20h. In addition to general conjoint hinging movement of the spoiler-edge panel combinations 20g, 20h, each spoiler can be swung upwardly independently of the associated edge panel 20h (FIGURE 10). This is done for lateral control purposes. For example, in the high subsonic cruise regime wherein torsional flexure of the wing caused by aileron reaction to deflection tends to invert the control effect of the ailerons due to their relative outboard positions, the ailerons are locked and control is shifted to the spoilers mounted inboard where the wing structure is stiffer. Suitable means for transferring lateral control from the ailerons to the spoilers are or may be conventional so will not be described specifically herein.

A line of main wing trailing edge bottom panels 20j is also provided. These panels are hinged at their forward edges to swing about an axis 20j1 substantially parallel to the hinge axis 20g1 and beneath the latter.

Also, the main wing carries a line of main flaps 20m and aft flaps 20n mounted and guided for both conjoint and relative movement. These can move fore and aft, together and apart, and through varying downward deflection angles. The arrangement permits nesting the flaps together by advancement of the aft flap into a pocket 20m′ on the aft underside of the main flap.

As shown best in FIGURE 10, the two flaps 20m and 20n nested together are drawn forwardly into the space defined by the plane of the lower edge panel 20j and the upper trailing edge panel composite 20g, 20h, and in this position the flaps then effectively become part of the lower edge panel. This shortens the main wing chord. With the panels and flaps thus positioned and the panels separated in generally parallel relationship they serve as fairing bridges between the trailing edge portion of the main wing 20 and the leading edge portion of the tail wing so as to integrate the wings aerodynamically into a continuous unitary airfoil section. It will be evident in this setting of the parts, that because the main wing's chord is shortened by forward retraction of its elements aft of its aft spar, this spar, which may have a deep section for reasons to appear, cooperates structurally with the front spar of the tail wing so as to achieve the effect of a strong mid-chord spar important to the strength and stiffness of the composite Delta airfoil. This results from the relatively close proximity of these spars and is assisted by locking the wings together by interengagement of connector elements 20p (FIGURE 17). The wing main parts, excluding structural elements, thus positioned appear in view A of FIGURE 10.

In FIGURE 10B the flaps and trailing edge panels have been repositioned so as to form an independent main wing of efficient airfoil configuration for the holding and subsonic cruise regimes. Here it will be seen that the composite spoiler and edge panel combination 20g, 20h at the upper surface of the main wing is tilted downward slightly from its position in FIGURE 10A so as to merge gently with the upper surface of the nested main and aft flaps which have been moved aft to extend the chord of the main wing. In thus reconstituting the airfoil form of the main wing, by utilizing the panels 20g, 20h to graduate the contour break in the upper surface, unseparated flow is preserved while desired camber is established. In this position the main flaps 20m lie immediately to the rear of the lower edge panel 20j to form therewith a continuous wing bottom surface. In this position of the parts the spoilers 20g, moved independently of associated edge panels 20h, may be used for lateral control purposes, as indicated by the broken lines.

In FIGURE 10C the main and aft flaps are moved aft beyond the panels 20h and deflected downwardly, as well as being slightly separated from each other, thereby to form a slotted flap configuration at both the leading and trailing edges of the main flap 20m. The lower edge panel 20j is then raised slightly so as to lead air efficiently into the slot beneath the trailing edge of panel 20h and the leading edge of main flap 20m. In this same setting, designed for the takeoff regime (maximum lift), leading edge slats 20d are extended to add lift, help balance torsion loading and reduce pitching moment.

In FIGURE 10D, illustrating the landing positions, the main and aft flaps are further extended and drooped and the lower edge panel 20j is further raised, so as to increase the lift and drag coefficients of the wing.

In the graphic representation shown at the bottom of FIGURE 10 connecting lines extending from the different stage views A, B, C and D lead to different parts of the graph lines to illustrate the angular positions in rotation of the slats and wing flap elements in terms of wing position measured in degrees of leading edge sweep angle. The graphic illustration shows the angular positions of the inboard and outboard wing slats, which for well known reasons may be programmed differently as a function of main wing portion and associated flight regime.

Aft and inboard from the main wing hinges 36, the reduced-span portions of stub wings 18 have normally covered through-openings 18g. Each opening 18g is closed at the bottom surface of the stub wing by hinged doors 18h (FIGURE 12) that swing downward at their inboard edges when the openings are to be uncovered. At the upper surface of the stub wing, each opening 18g is normally covered or closed by a composite of elements including first, a panel 40 hinged at its forward edge along the front edge of the opening 18g, second, the exposed upper surface portions of nested foreflap 42 and midflap 44 and, third, the deflector 46 hinged at its rear edge along the rear edge of the opening 18g. As do the panel 40 and deflector 46, the flaps 42 and 44 extend spanwise across substantially the full width of the opening 18g so as to form a substantially continuous cover flush with the stub wing's upper surface. This is the position of the inboard flap system parts (with the doors 18h raised to the closed position).

For landing and takeoff operations the foreflap 42 and midflap 44 are moved aft, downwardly and apart, and are swung into positions of large positive angles of attack, as shown by solid lines in FIGURE 12 and as indicated at a smaller scale in FIGURES 5 and 7. At the same time, panel 40 is swung downward to stay with the foreflap, and deflector 46 is swung upwardly, into their respective solid-line positions, thereby to enhance airflow downwardly through the opening 18g. A third or aft flap 48 fixed in rearwardly spaced relationship to the main flap 44 constitutes in effect a part of the main flap. Just as the main wing flaps are given a different degree of adjustment for takeoff than for landing operations, so may the inboard flaps have two operative settings coordinated with the main wing flaps which they augment as a means of carrying the line of lift devices of the main wing inboard substantially to the fuselage as desired.

In FIGURE 12 mechanism for moving the inboard flaps and the associated panels 40 and 46 is depicted in somewhat simplified and partially schematic form. This mechanism, duplicated at inboard and outboard sides of the flap system, includes a power-driven jackscrew 50 pivotally mounted on a transverse axis at 52 and projecting forwardly from its mount to pass in threaded engagement through a traveling nut 54 which in turn is pivotally connected at 56 to one arm of a bell crank 58 and to a link 60. The opposite end of link 60 is pivotally connected at 62 to the deflector 46. Bell crank 58 is pivoted at its elbow 64 to a bracket structure 66 at the side of the stub wing opening 18g, and it has a second and longer arm pivotally joined at 68 to the main flap 44 at a substantially mid-chord position thereon. The nose of flap 44 is pivotally connected to a link 70 hinged at 71 on a stationary bracket 74. Similarly, flap 42 is swingably supported by a link 76 whose upper end is hinged at 72 on a bracket 78 slightly forward of the bracket 74 and whose lower end is hinged at 80 to a substantially midchord point on the flap 42. At its top and near its nose, flap 42 is also supported at 82 on the lower end of a link 84 hinged at 86 to a stationary bracket 87 forwardly of the bracket 78. Links 84 and 70 are pivotally joined for conjoint motion by a connecting link 88. A pin 90 on link 84 is disposed in triangular relationship with the connecting points on this link with flap 42 and link 88. Pin 90 slides and rotates in a track 92. The latter extends lengthwise of a guide member 94 mounted along the edge of panel 40. The operation of this mechanism is such that rotation of jackscrew 50 in one direction causes the parts to move from their solid-line positions toward their broken-line positions, and reversely when the jackscrew is reversed.

As will be seen in FIGURE 12, each inboard engine inlet 24a, located below the airfoil fixed structure adjacent the side of the fuselage, lies almost directly behind one downwardly extended inboard flap system (42, 44 and 48). Thus the relative placement of these inboard flaps enables them to serve in the important additional capacity of ingestion shields for the engines, deflecting foreign materials such as water, slush, rubber tire fragments, etc., during ground runs. In addition, these extended inboard flaps provide protection against bird ingestion and help to eliminate any adverse effects of airflow pattern disturbance caused by extension of the landing wheels. To the extent that these inboard flaps limit flow of air to the engine inlet 24a beneath the airfoil, the loss is offset by circulation through the now open well 18g. In sucking air through these auxiliary paths the engines thereby increase the lift of the flaps by increasing the velocity of airflow across their upper surfaces and through their slots. The flap system of the main wing also provides ingestion shielding for the outboard engines 26, although in their case the need for auxiliary airflow paths and for pattern disturbance protection is not as critical due to the relative inboard locations of the landing wheels in relation to the outboard engine inlets, together with the relatively wide fore and aft separation of the main wing from the engine inlets. The shielding action is depicted in FIGURES 13, 14 and 15. In the first figure the spray patterns for water, slush, etc., thrown up by the main landing wheels, are seen approximately in relation to the respective inlet planes of the outboard and inboard engines, the respective pattern being designated O and I. It will be seen that the inboard engine 24 is shielded over most of the area of its inlet 24a by the inboard flap system 42, 44, 48, whereas the outboard engine is similarly shielded against ingestion at its inlet 26a by the inboard and main flap systems. FIGURES 14 and 15 also illustrate the effect from a side elevational aspect.

An aerodynamic fence 100 extends longitudinally along the lower surface of the airfoil at a chord position between the inboard flaps and wing flaps, so as to prevent shock wave interference between adjacent engines should one fail to operate.

FIGURE 19 shows in abbreviated and simplified form typical arrangements for guiding the main wing flaps for extension and retraction movements. Such motion of the main flap 20m is by a reversible power-driven jackscrew 110 pivoted at 112 on a transverse horizontal axis. A control arm 114 rigidly projecting forwardly from the flap 20m carries a pivoted nut 116 in threaded engagement with the screw 110, so that turning of the latter causes movement of the main flap in a direction fore and aft. The control arm 114 carries cam rollers 118 and 120 thereon which respectively engage the curved top and bottom rails 122a and 122b of truck cam 122 rigidly mounted at points 124 on a rib member 126. The cam track shapes and associated roller placements on the flap control arm are such as to coordinate the main flap's components of motion according to the desired program as depicted generally in FIGURE 10. To program its movement relative to the main flap, aft flap 20n is likewise provided with a rigid control arm 126 having cam rollers 128 and 130 engaging the respective tracks 132a and 132b of a cam 132 suitably mounted on the main flap. A power-driven jackscrew 134 provides the force to move the aft flap relative to the main flap as desired.

In FIGURE 20 the manner in which the main wing and stub wing parts overlap aft of hinge 36 and nest together when the main wing is retracted for supersonic flight is depicted in a simplified, partially schematic representation. The root portion of main wing 20 is partly socketed within stub wing 18. Stub wing flaps and panel elements in their retracted position lie along and help define the top surfaces of airfoil 12. Disposed at a lower elevation to clear these stub wing elements, main wing flaps 20m and 20n and lower panel 20j lie along and help define the bottom surface of airfoil 12.

These and other aspects of the invention will be apparent to those skilled in the art having reference to the foregoing description and accompanying illustrations.

We claim as our invention:

1. A variable-sweep integrated wing system for high-speed airplanes comprising oppositely directed horizontal swept-wing airfoils forming a Delta planform and each composed of a laterally extending tail wing aft, a laterally extending main wing substantially abutted along its trailing edge to the tail wing's leading edge, and a fixed stub wing inboard of the main wing, said main wing being hinged adjacent its inboard end to swing forwardly from the tail wing and having a line of flaps extending along the trailing edge thereof, said flaps being extensible downwardly and aft therefrom to increase the main wing's lift, said fixed stub wing also having flaps therein which are extensible downwardly and aft to produce increased lift, the stub wing's flaps being located generally in line with the main wing's flaps.

2. The combination defined in claim 1, wherein the stub wings have normally covered through-openings therein in registry with the stub wing flaps, and means operable to uncover said openings with extension of the stub wing flaps so as to permit downward and rearward sweep of air through such openings across the upper surfaces of the extended flaps.

3. A high-speed airplane including the combination defined in claim 2, and having landing gear located generally forwardly of and beneath the stub wing's flaps and engines with air inlets located generally directly behind the stub wing flaps to be shielded by the latter, whereby such inlets induce downward and rearward airflow through said openings and across the flaps as the latter are shielding the inlets from ingestion of materials thrown up from the landing gear.

4. The combination defined in claim 3, wherein the main wing's trailing edge comprises top and bottom panels hinged along their forward edges and normally swung apart in generally parallel relationship with the wings joined so as to fair the main wing top and bottom surfaces with those of the tail wing, said flaps when retracted forward and upward being nested in the intervening space defined by and between said panels.

5. The combination defined in claim 4, and means operable with the main wing swung forward from the tail wing to extend the flaps substantially rearward and to shift one of the panels relative thereto so as to reform the main wing as an airfoil of increased chord efficiently shaped for subsonic cruise flight.

6. The combination defined in claim 5, and means to extend the stub wing's flaps and to extend the main wing's flaps further aft and downward so as to increase the lift for landing at low subsonic speeds.

7. The combination defined in claim 6, wherein the upper panels comprise elements connected to be swung upwardly in controlled manner so as to function as spoilers, independently of flap position.

8. The combination defined in claim 1, wherein the chord length of the main wing generally decreases outboard substantially from its root, and the line of flaps on the main wing extends outboard from a location substantially from the main wing's root.

9. A variable-sweep integrated wing system for high-speed airplanes comprising oppositely directed horizontal swept-wing airfoils forming a Delta platform and each composed of a laterally extending tail wing aft, a laterally extending main wing normally abutted along its trailing edge to the tail wing's leading edge, and a fixed stub wing inboard of the main wing, said main wing being hinged adjacent its inboard end to swing forwardly from the tail wing, said stub wing having a swept-back leading edge and a span that increases progressively along the length of such leading edge, then assumes an abruptly reduced span to form a notch, and continues aft therefrom at reduced span to merge with the tail wing, the hinge of the main wing being located on the stub wing adjacent the corner of the notch and in the root of the main wing at approximately the mid-chord point thereon, said main wing having a chord length that increases inboard to its root such that viewed in planform the corner portion thereof aft of the hinge overlaps the stub wing with the main wing swung back to its normal position.

10. The combination defined in claim 9, wherein the main wing has a line of flaps carried along the trailing edge thereof and extending inboard substantially to the root of the main wing, the stub wing also carrying flaps set into its portion of reduced width so as to effectively continue inboard the main wing's line of flaps, said main wing and stub wing flaps being extensible aft and downward to provide increased lift to the wing system with the main wing swung forward, and being retractable into the chord forms of their respective wings at respectively ferent levels of height where the wings overlap so as to provide clearance permitting mutual overlap thereof with the main wing swung aft to its normal position.

11. A variable-sweep integrated wing system for high-speed airplanes comprising main and tail wings normally abutted along a common laterally extending edge to comprise a composite airfoil, said main wing being hinged adjacent its inboard end to swing forwardly from the tail wing in subsonic flight, said main wing having a trailing edge portion comprising upper and lower wing surface-defining elements hinged on laterally extending axes to move together and apart so as to vary the trailing edge closure angle and edge thickness of the main wing, said elements being normally separated in generally parallel relationship to continue the upper and lower surfaces of the wings in forming said composite airfoil, and flap means carried by the main wing's trailing edge portion movable forwardly into the chord outline of the main wing so as to be substantially covered by the upper wing surface defining element and permit wing abutment without interference from said flap means, said flap means being movable aft with the wings separated so as to lengthen the chord and reconstitute the trailing edge chordal cross-sectional form of the main wing, accompanied by relative hinging of at least one surface-defining element which maintains the adjacent wing surface in faired relationship with the extended flap means, said flap means being further extensible rearwardly and downwardly to further increase the chord and add lift and drag to the main wing in low-speed regimes.

12. A supersonic airplane comprising oppositely directed substantially continuous airfoils having fixed aft portions supporting forward-thrust engines mounted therebeneath with inlets positioned to draw air along the bottom airfoil surfaces, retractable flaps mounted in said airfoils in positions ahead of the inlets to be extended downwardly below the airfoils into transversely extending positions to shield said inlets, and flow circulation means for opening up auxiliary passages through the airfoils aft of the flaps and ahead of the inlets with the flaps extended, thereby to augment the air supply to the inlets.

13. The combination defined in claim 12, wherein each airfoil includes a hinged main wing carrying such flaps and operatble to swing forwardly from the fixed airfoil portion aft thereof so as to open up such auxiliary passages.

14. The combination defined in claim 13, wherein each airfoil also includes a fixed stub wing carrying such flaps, inboard of the main wing and extending forwardly from the airfoil aft portion ahead of an engine inlet, and the flow circulation means further comprises a normally closed opening in the stub wing opened with extension of the flaps on the stub wing.

15. The combination defined in claim 12, wherein each airfoil includes a hinged main wing operable to swing forward in relation to the fixed aft portion of the airfoil, and a fixed stub wing inboard of the main wing and extending forwardly from the airfoil aft portion ahead of an engine inlet, and the flow circulation means comprises a normal closed opening in the stub wing opened with extension of the flaps on the stub wing.

16. In a supersonic airplane having front and rear wings normaly abutted on a laterally extending line but separable fore and aft to function as independent airfoils, hinged panel means on the top surface trailing edge of the front wing separable relatively to merge and fair such wing with the leading portion of the rear wing so as to form a unitary continuous airfoil, means operable with the wings thus separated to reform the airfoil contour and increase the chord length of the front wing, including a rearwardly convergent panel member of airfoil trailing edge configuration displaceable from the front wing accompanied by relative tilting of said hinged panel means to graduate the camber of the front wing's top surface into that of said hinged panel means.

17. In a variable-sweep wing airplane, integrated main, tail and stub wings, hinge means at approximately a midspan position and mid-chord position on the stub wing mounting the main wing substantially at a mid-chord position at its root for hinging forwardly from abutment of its trailing edge with the tail wing, the root portion of the main wing forward of its hinge being movably socketed in the outboard end of the stub wing, and both wings having elements which mutually overlap in an area aft of the hinge, with the main wing swung back into such abutment.

18. The combination defined in claim 1 7, wherein the respective overlapping elements include retractable lift flap means which nest at relatively different heights on their respective wings so as to permit such operlap.

19. In a high-speed airplane having airfoils including a forward wing and a fixed tail wing aft thereof carrying beneath it an engine with its inlet disposed aft of the foward wing so as to draw its air normally aft through the region beneath the forward wing, normally retraced flap means on the forward wing, which are extensible downwardly therefrom to increase wing lift and which are then so located in front of the inlet as to deflect objects away from the same, and means operable with the flap means extended so as to open up an auxiliary path for air for the engine, including a passageway directly overlying the extended flap means.

20. A variable-sweep integrated wing system for airplanes having oppositely directed horizontal airfoil surfaces comprising a laterally extending main wing, a fixed stub wing inboard of the main wing and generally in the plane of the main wing, a laterally extending tail wing aft of said main wing, said tail wing being joined to and extending generally in the plane of the stub wing, said main wing being hinged adjacent its inboard end to said fixed stub wing and actuatable to swing forwardly from a position wherein its trailing edge is in substantially abutted relationship with the leading edge of said stub wing, and flap means retractably mounted at a generally intermediate fore-and-aft location on the stub wing and actuatable to extend operatively therefrom so as to increase lift of the airfoil surface, 21. The wing system defined in claim 20, wherein the stub wing has a normally covered through-opening into which the stub wing's flap means are retractable, and means to uncover said opening with extension of the flap means so as to permit downward and rearward sweep of air through such opening across the upper surface of one flap means.

22. An airplane having the wing system defined in claim 21, having landing gear located generally forwardly of and beneath the stub wing's through-opening, and having an engine with an air inlet located generally behind the extended portion of the stub wing flap means.

References Cited

UNITED STATES PATENTS

| 2,836,380 | 5/1958 | Pearson | 244—42 |
| 2,936,969 | 5/1960 | Griffith et al. | 244—55 X |
| 3,292,881 | 12/1966 | Ricard | 244—46 |

MILTON BUCHLER, *Primary Examiner.*

RICHARD A. DORNON, *Assistant Examiner.*

U.S. Cl. X.R.

244—42, 46, 55, 102

PO-1050
(5/69)

UNITED STATES PATENT OFFICE
CERTIFICATE OF CORRECTION

Patent No. 3,447,761          Dated June 3, 1969

Inventor(s) Philip C. Whitener, Robert R. Wadleigh and David G. Blattner

It is certified that error appears in the above-identified patent and that said Letters Patent are hereby corrected as shown below:

Column 1, line 57, (between the Abstract and the Description) insert the following:

The invention described and claimed herein resulted from work done under a United States Government Contract No. FA-SS-67-3, and the United States Government has an irrevocable, non-exclusive license hereunder to practice and have practiced the invention claimed herein, including the unlimited right to sub-license others to practice and have practiced the claimed invention for any purposes whatsoever.

SIGNED AND
SEALED
APR 7 1970

(SEAL)
Attest:

Edward M. Fletcher, Jr.
Attesting Officer

WILLIAM E. SCHUYLER, JR.
Commissioner of Patents